US012296585B2

(12) United States Patent
Steurrys et al.

(10) Patent No.: US 12,296,585 B2
(45) Date of Patent: May 13, 2025

(54) SYSTEM AND METHOD FOR IMPROVING IMAGE QUALITY BY ORIENTING ADJACENT PRINTHEADS TO PRODUCE OPPOSITE DIRECTION INK FLOWS IN THE MANIFOLDS OF THE ADJACENT PRINTHEADS

(71) Applicant: Xerox Corporation, Norwalk, CT (US)

(72) Inventors: Christine A. Steurrys, Williamson, NY (US); John P. Meyers, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 255 days.

(21) Appl. No.: 17/934,723

(22) Filed: Sep. 23, 2022

(65) Prior Publication Data

US 2024/0100825 A1 Mar. 28, 2024

(51) Int. Cl.
*B41J 2/045* (2006.01)

(52) U.S. Cl.
CPC ......... *B41J 2/04563* (2013.01); *B41J 2/0454* (2013.01)

(58) Field of Classification Search
CPC . B41J 2/175; B41J 2/1752; B41J 29/02; B41J 3/543; B41J 2/165; B41J 2/18; B41J 2002/14419; B41J 2202/20; B41J 2202/19; B41J 2/14; B41J 2/155; B41J 2202/12; B41J 2202/08; B41J 2/04563; B41J 2/0454; B41J 2/14145; B41J 2202/21; B41J 2/2146; B41J 2002/14362; B41J 2/17523; B41J 2/17513
See application file for complete search history.

(56) References Cited

U.S. PATENT DOCUMENTS

2009/0295867 A1* 12/2009 Oguchi .................... B41J 2/145 347/40

* cited by examiner

*Primary Examiner* — Jannelle M Lebron
(74) *Attorney, Agent, or Firm* — Maginot Moore & Beck LLP

(57) ABSTRACT

An inkjet printer configures the printheads in a printhead module in an orientation that attenuates a temperature differential between the ink drops ejected by adjacent printheads at a stitch area between the adjacent printheads. The reduced temperature differential helps ensure that the contrasts between the two inks ejected by the adjacent printheads is sufficiently similar that image quality is not adversely impacted.

18 Claims, 6 Drawing Sheets

SYSTEM AND METHOD FOR IMPROVING IMAGE QUALITY BY ORIENTING ADJACENT PRINTHEADS TO PRODUCE OPPOSITE DIRECTION INK FLOWS IN THE MANIFOLDS OF THE ADJACENT PRINTHEADS

TECHNICAL FIELD

This disclosure relates generally to devices that produce ink images on media, and more particularly, to the heating of ink within the printheads in such devices.

BACKGROUND

Inkjet imaging devices, also known as inkjet printers, eject liquid ink from printheads to form images on an image receiving surface. The printheads include a plurality of inkjets having nozzles that are arranged in an array in the faceplate of a printhead. As used in this document, the term “array of nozzles” means a pattern of nozzles in the faceplate of a printhead. Each printhead includes a manifold that is coupled at one end of the manifold to an ink supply. A heater extends the length of the manifold to heat the ink as the ink flows from the end coupled to the ink supply to the opposite end of the manifold where the ink moves through the printhead to supply the inkjets. Each inkjet has a thermal or piezoelectric actuator that is coupled to a printhead controller. The printhead controller generates firing signals that correspond to digital data content for the images to be printed. The actuators in the printheads respond to the firing signals by expanding into an ink chamber of the inkjet to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK printers have two printhead modules that print each color of ink. The printhead modules that print the same color of ink are offset from each other by one-half of the distance between adjacent inkjets in the cross-process direction to double the number of pixels per inch of a line of the color of ink ejected by the printheads in the two modules. As used in this document, the term “process direction” means the direction of movement of the image receiving surface as it passes the printheads in the printer and the term “cross-process direction” means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the development of a temperature gradient in the ink within a printhead during a print job when inkjets in the printhead are used to print high ink coverage areas in successive images. This issue is described with reference to FIG. 3A. In that figure, three printheads of a printhead module are configured as an outboard printhead, a center printhead, and an inboard printhead. At the inlet to the manifold of each printhead, relatively cool ink enters and as the ink moves through the manifold, the ink is heated to an appropriate operational temperature at the opposite end of the manifold. The heated ink then flows to the ink chambers across the printhead for each inkjet. If a large number of inkjets are operated to eject ink, the demand for ink in the printhead increases. Thus, more ink is pulled through the manifold so the ink exiting the manifold is heated non-uniformly. As this cooler ink passes through the printhead, a temperature differential is produced between the ink at the manifold outlet and the ink at the inkjets farthest from the manifold outlet. The cooler ink has a higher viscosity than the warmer ink and that viscosity difference causes smaller drops of the cooler ink to be ejected so the areas of the smaller cooler ink drops appear lighter than the areas of the warmer ink drops. While the differences in the appearance of these two areas is not detectable at opposite ends of a printhead, it is detectable at the boundaries of stitch areas between adjacent printheads. For example, in the stitch area between the outboard printhead and the center printhead, the outboard printhead ejects warm ink drops at the stitch area while the center printhead ejects cooler ink at the stitch area. In the stitch area between the inboard printhead and the center printhead, the inboard printhead ejects cooler ink at the stitch area while the center printhead ejects warmer ink in the stitch area. The contrast in the differences between the light and dark ink drops in these stitch areas can be perceptible enough to degrade the quality of the ink images. This problem can resolve itself within a print run as the images change and the ink throughput changes correspondingly; however, the affected sheets may have to be discarded and reprinted. Reducing the ink temperature differences in the stitch areas between adjacent printheads during ink image printing would be beneficial.

SUMMARY

A color inkjet printer is configured to reduce the temperature differential between ink drops ejected into stitch areas between adjacent printheads. The color inkjet printer includes a media transport that passes media through the inkjet printer in a process direction, and at least two printheads mounted relative to the media transport, each printhead having an ink inlet configured to supply ink to a manifold in the printhead, the manifold being configured to supply ink to at least one array of nozzles in the printhead, the ink flowing through the manifold in a flow direction, and the at least two printheads being oriented so ink entering through the ink inlets in adjacent printheads flows in opposite flow directions in the manifolds of the adjacent printheads.

A printhead module in a color inkjet printer reduces the temperature differential between ink drops ejected into stitch areas between adjacent printheads. The printhead module includes a first printhead, and at least a second printhead, each printhead having an ink inlet configured to supply ink to a manifold in the printhead, the manifold being configured to supply ink to at least one array of nozzles in the printhead, the ink flowing through the manifold in a flow direction, and the first printhead and the at least second printhead being oriented so ink entering through the ink inlets in adjacent printheads flows in opposite flow directions in the manifolds of the adjacent printheads.

BRIEF DESCRIPTION OF THE DRAWINGS

The foregoing aspects and other features of a color inkjet printer and a printhead module for a color inkjet printer that reduces the temperature differential between ink drops ejected into stitch areas between adjacent printheads are explained in the following description, taken in connection with the accompanying drawings.

DETAILED DESCRIPTION

Figure 1:
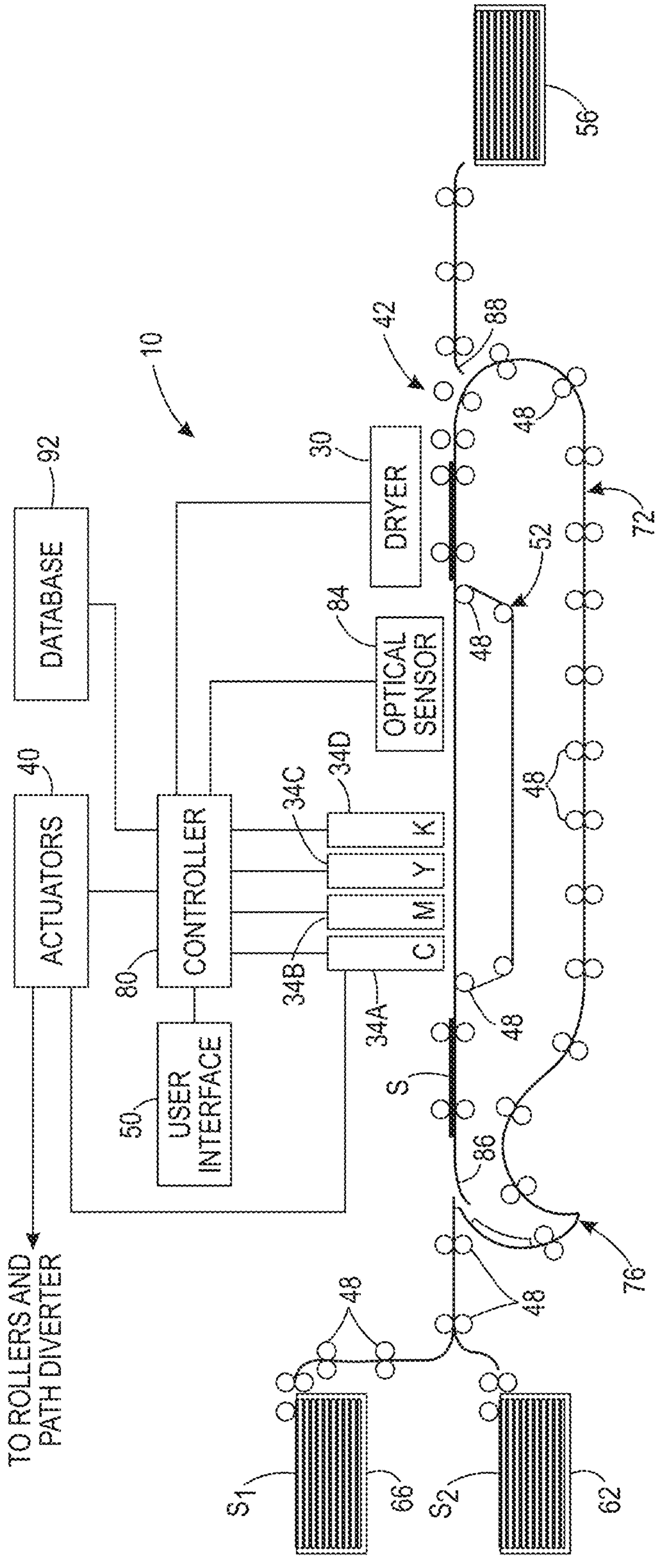
FIG. 1 is a schematic drawing of a color inkjet printer that is configured to reduce the temperature differential between ink drops ejected at the edges of stitch areas between adjacent printheads.

For a general understanding of the environment for the printer and the printhead module in the printer disclosed herein as well as the details for the printer and the printhead module, reference is made to the drawings. In the drawings, like reference numerals have been used throughout to designate like elements. As used herein, the word "printer" encompasses any apparatus that ejects ink drops onto media to form ink images.

The printer and printhead module described below reverses the orientation of adjacent printheads in a printhead module to reduce the temperature differential between ink drops ejected into stitch areas between adjacent printheads. Specifically, the adjacent printheads are oriented so the ink flow in the manifolds of adjacent printheads is in opposite directions. As used in this document, the term "ink flow direction" means the direction of fluid flow through the manifold of a printhead in the cross-process direction.

FIG. 1 depicts a high-speed color inkjet printer 10 that is configured to reduce the temperature differential between ink drops ejected into stitch areas between adjacent printheads. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2A) of the printer. In embodiments of the printer, the printhead modules have a plurality of printheads with each printhead having a width that is less than a width of the widest media in the cross-process direction that the printer can print. In these modules, the printheads are arranged in a staggered array that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2A:
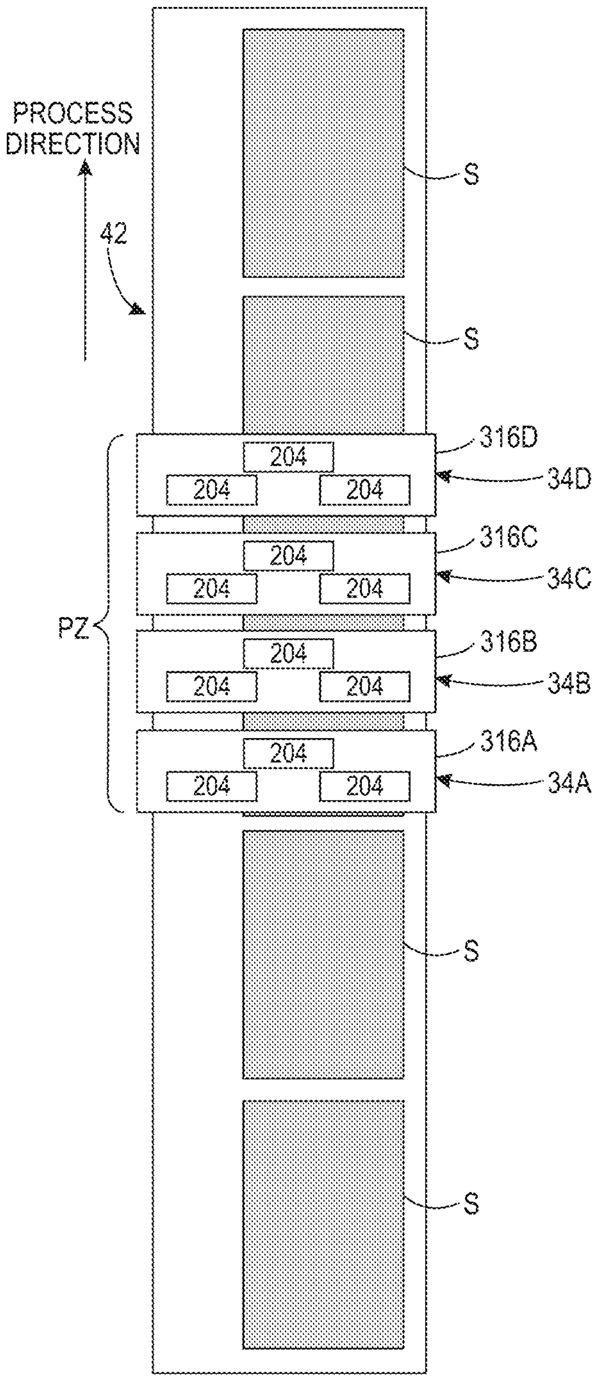
FIG. 2A depicts the print zone in the printer of FIG. 1.
Figure 2B:
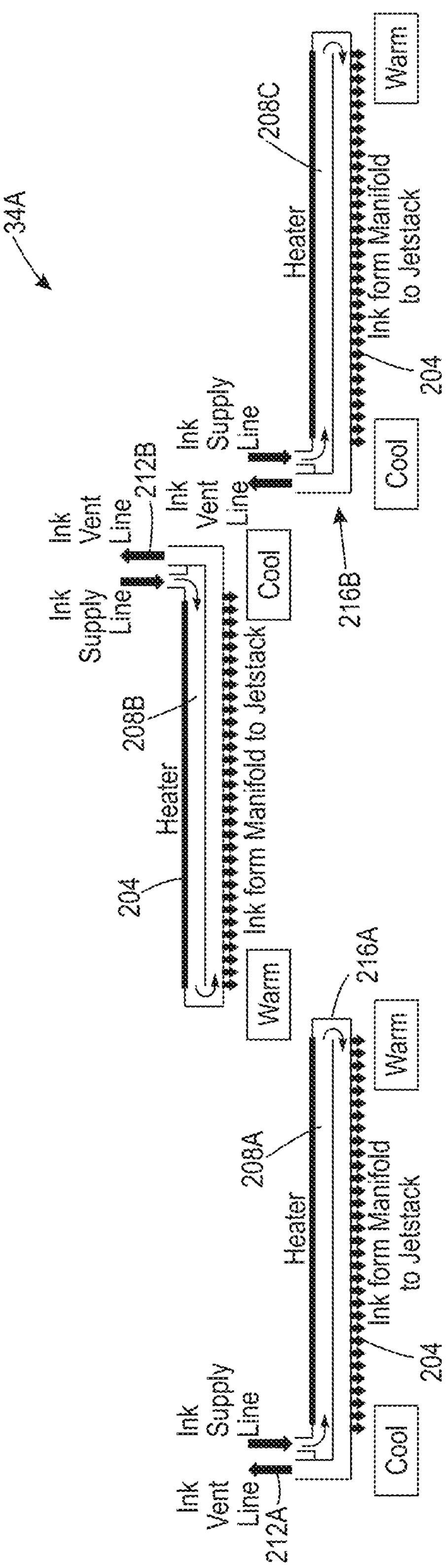
FIG. 2B depicts the reversal of the ends of the center printhead that reduces the temperature differential between ink drops ejected into stitch areas between adjacent printheads in the print zone of FIG. 2A.

The print zone PZ in the printer 10 of FIG. 1 is shown in FIG. 2A. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2A has three printheads 204 mounted to one of the printhead carrier plates 316A, 316B, 316C, and 316D, respectively. Although the printheads are staggered so the center printhead is offset from the other two printheads in the process direction, the ends of the printheads are positioned so the printheads of the module can print a continuous line of pixels that extend in the cross-process direction across passing media when all of the inkjets in the three printheads are operated. The area where the right side of one printhead ejects ink drops that are interleaved with the ink drops ejected by the left side of an adjacent printhead is called a "stitch area" in this document. The direction of the flow of ink through the manifold of the center printhead in the cross-process direction is in the opposite direction of the flow of ink in the manifold of the adjacent printhead in the cross-process direction as shown in FIG. 2B and described in more detail below.

As shown in FIG. 1, the printed image passes under an image dryer 30 after the ink image is printed on a sheet S and the ink image has passed the optical sensor 84. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been printed and move it by the rotation of rollers in an opposite direction to the direction of movement past the printheads. At position 76 in the duplex path 72, the substrate can be turned over so it can merge into the job stream being carried by the media transport 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the dryer 30 and the receptacle 56, they pass by an optical sensor 84. The optical sensor 84 generates image data of the ink images on the printed sheets and this image data is analyzed by the controller 80. The controller 80 is configured to detect streakiness in the ink images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor 84 can be a digital camera, an array of LEDs and photodetectors, or other devices configured to generate image data of a passing surface. As already noted, the media transport also includes a duplex path that can turn a sheet over and return it to the media transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each ejected ink drop that forms pixels in an ink image to be printed on a media sheet.

Figure 2C:
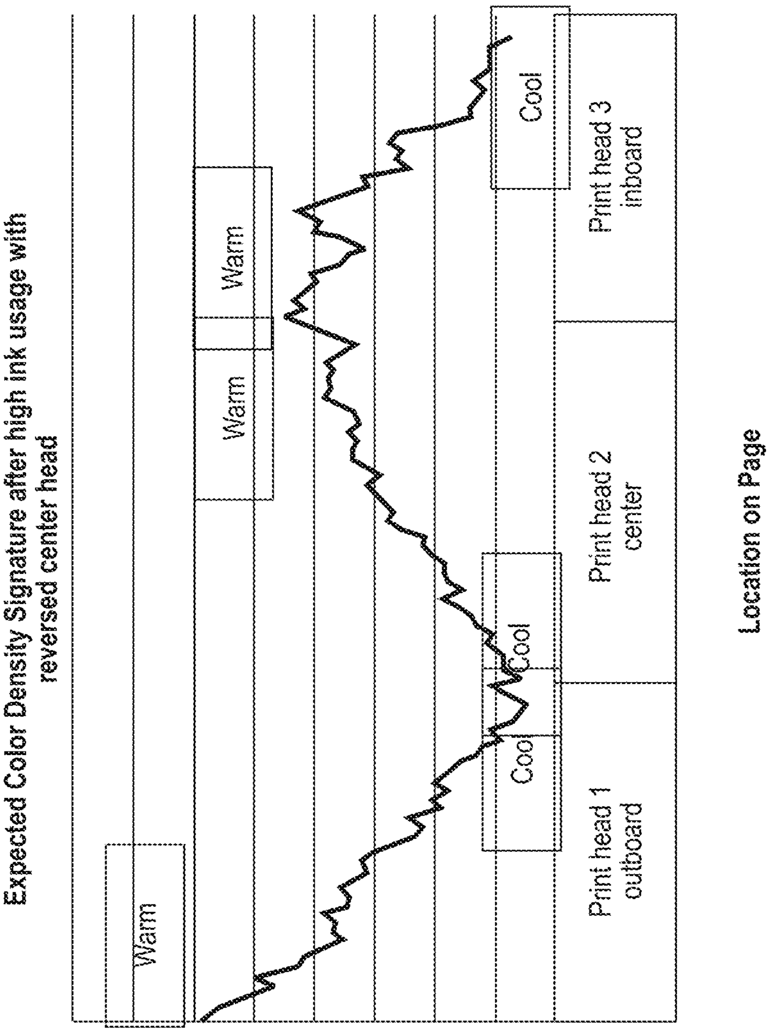
FIG. 2C is a graph of the color density shift between printheads in a printhead module in which the printheads are arranged with an alternating orientation shown in FIG. 2B.
Figure 3A:
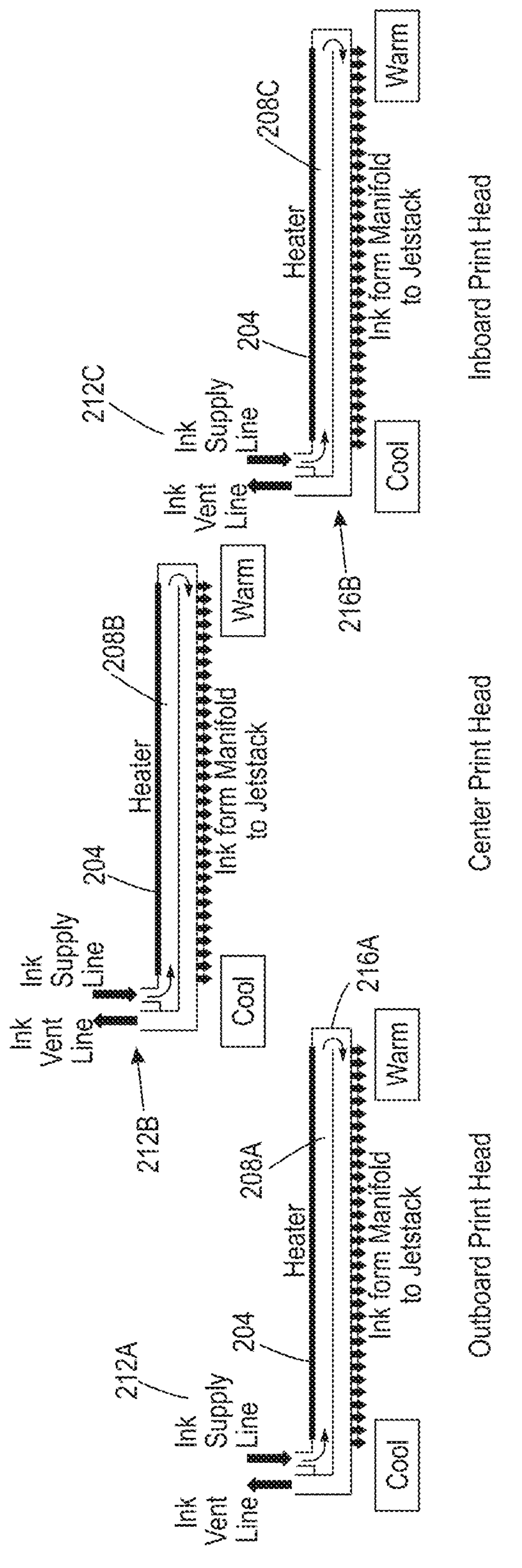
FIG. 3A (Prior Art)
FIG. 3A depicts the orientation of printheads in a printhead module in a prior art inkjet printer that can produce a temperature differential between ink drops ejected into a stitch area of adjacent printheads.
Figure 3B:
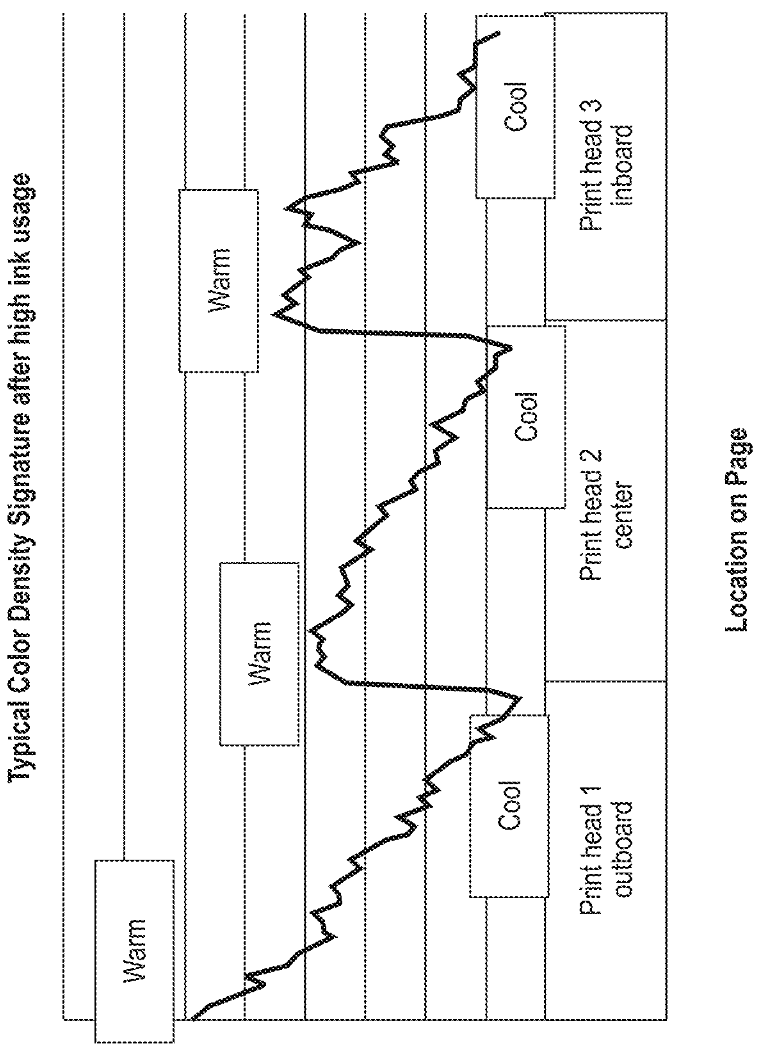
FIG. 3B (Prior Art)
FIG. 3B is a graph of the color density shift between printheads in a prior art printhead module.

FIG. 2B shows the printheads 204 of the printhead module 34A. The center printhead has been rotated so the ink inlet 212B to the manifold 208 is on the opposite end of the printhead 204 than the ink inlets 212A and 212C to the ink manifolds 208A and 208C are. Thus, the ink flow through the manifold 208B is in the opposite direction of the ink flow through manifolds 208A and 208C. As a consequence, the warmer ink in the center printhead is ejected into the stitch area between the outboard printhead and the center printhead where the outboard printhead also ejects warmer ink while the cooler ink in the center printhead is ejected into the stitch area between the inboard printhead and the center printhead where the inboard printhead also ejects cooler ink. The graph of FIG. 2C shows that the reorientation of the center printhead enables the color density in the stitch area between adjacent printheads to be similar rather than dissimilar to a degree that is discernible by the human eye. Thus, the ink drops ejected into the stitch areas 216A and 216B do not have as large of a temperature differential as the stitch areas 216A and 216B have in FIG. 3A. That is, because the ink flow through all of the manifolds 208A, 208B, and 208C are in the same direction in FIG. 3A, warmer ink drops from the outboard printhead and cooler ink drops from the center printhead are ejected into the stitch area 216A while the warmer ink drops from the center printhead and the cooler ink drops from the inboard printhead are ejected into the stitch area 216B. As shown by the graph of FIG. 3B, the temperature differences between ink ejected from adjacent printheads in the prior art printer results in color density differences that are humanly perceptible in the stitch areas between adjacent printheads.

Reversing the orientation of every other printhead in a printhead module can be achieved more simply than heating the ink to a predetermined temperature prior to entry of the ink into the printhead. Reversing the orientation of the printhead as described above, however, changes the physical locations of the inkjets in the inkjet array of a printhead.

Thus, the controller is configured to alter image path and image based controls to account for these physical location changes. Image path controls refers to the processing of ink image content data using the new inkjet positions to generate the firing signals to ensure that the pixels are printed at the correct locations on the media. Image based controls refer to the use of the new inkjet positions to register the ink drops ejected by the inkjets in the printhead modules and to perform inoperative inkjet compensation techniques during printing. Such inkjet compensation techniques are well-known within the art. Also, some minor hardware changes are needed as well, such as, for example, bolt locations and mounting plate opening sizes may change, the operation of motors for aligning the inkjets in the stitch areas between adjacent printheads may change as well as the operation of motors for roll positioning of the printheads, and the length of ink delivery tubes may change as a result of the new positions of the ink inlets on the reversed printheads.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:

a media transport that passes media through the inkjet printer in a process direction; and at least three printheads mounted relative to the media transport and the three printheads being aligned in a cross-process direction to form a first printhead module having a first printhead between a second printhead and a third printhead, each printhead having a single ink inlet configured to supply ink to a manifold in the printhead, the manifold being configured to supply ink to at least one array of nozzles in the printhead, the ink inlet of the first printhead is positioned at an end of the first printhead in the cross-process direction that is opposite to an end in which the ink inlet of the second printhead is positioned and opposite to an end in which the ink inlet of the third printhead is positioned in the cross-process direction to reduce a difference in temperatures between ink ejected by the first printhead and the second printhead into a stitch area between the first and second printheads and to reduce a difference in temperatures between ink ejected by the first printhead and the third printhead into a stitch area between the first and third printheads.

2. The inkjet printer of claim 1 wherein every other printhead in the at least three printheads is oriented so ink entering through the ink inlets in adjacent printheads flows in opposite directions in the manifolds of the adjacent printheads.

3. The inkjet printer of claim 2 further comprising:

a controller operatively connected to the at least three printheads, the controller being configured to use ink image content data to operate the at least three printheads to form ink images with ink drops ejected from the at least three printheads.

4. The inkjet printer of claim 3, the controller being further configured to:

modify at least one of image path controls and image based controls to account for differences in inkjet locations in the adjacent printheads.

5. The inkjet printer of claim 4, the controller being further configured to modify image path controls by processing ink image content data using new inkjet positions in printheads oriented to provide ink flow in the manifold that is in the opposite direction to the ink flow in the manifolds of the second and third printheads to ensure that pixels are printed at correct locations on media carried by the media transport.

6. The inkjet printer of claim 5, the controller being further configured to modify image based controls by using the new inkjet positions to register the ink drops ejected by the inkjets in the first printhead module.

7. The inkjet printer of claim 6, the controller being further configured to modify image based controls by performing inoperative inkjet compensation techniques using the new inkjet positions during printing.

8. The inkjet printer of claim 1 wherein the first printhead is offset from the second and the third printheads in the process direction.

9. The inkjet printer of claim 8 wherein the at least three printheads in the first printhead module are aligned in the cross-process direction so the at least three printheads can form a continuous line of pixels in the cross-process direction.

10. The inkjet printer of claim 9 further comprising:

a second printhead module having at least three printheads mounted relative to the media transport, each printhead in the at least three printheads of the second printhead module having a single ink inlet and a manifold through which ink flows to inkjets and the second printhead module is positioned to follow the first printhead module in the process direction.

11. The inkjet printer of claim 10 wherein the at least three printheads in the second printhead module are staggered with respect to one another in the process direction.

12. The inkjet printer of claim 10 wherein the at least three printheads in the second printhead module are aligned in the cross-process direction so the at least three printheads can form a continuous line of pixels in the cross-process direction.

13. The inkjet printer of claim 12 wherein every other printhead in the at least three printheads of the second printhead module is oriented so ink flows in a direction through a manifold of the every other printhead in the second printhead module in a direction that is opposite a direction that ink flows in the manifold of each printhead adjacent to the every other printhead.

14. A printhead module for installation in an inkjet printer comprising:

at least three printheads mounted to a member so the at least three printheads are aligned in a cross-process direction with a first printhead being positioned between a second printhead and a third printhead in the cross-process direction, each printhead having a single ink inlet configured to supply ink to a manifold in the printhead, the manifold being configured to supply ink to at least one array of nozzles in the printhead, the ink inlet of the first printhead is positioned at an end of the first printhead in the cross-process direction that is opposite to an end in which the ink inlet of the second printhead is positioned and opposite to an end in which the ink inlet of the third printhead is positioned in the cross-process direction to reduce a difference in temperatures between ink ejected by the first printhead and the second printhead into a stitch area between the first and second printheads and to reduce a difference in temperatures between ink ejected by the first printhead and the third printhead into a stitch area between the first and third printheads.

15. The printhead module of claim 14 wherein every other printhead in the at least three printheads is oriented so ink entering through the ink inlets in adjacent printheads flows in opposite directions in the manifolds of the adjacent printheads.

16. The printhead module printer of claim 14 wherein the first printhead is offset from the second and the third printheads in the process direction.

17. The printhead module of claim 16 wherein the at least three printheads in the first printhead module are aligned in the cross-process direction so the at least three printheads can form a continuous line of pixels in the cross-process direction.

18. An inkjet printer comprising:

a media transport that passes media through the inkjet printer in a process direction;

at least three printheads mounted relative to the media transport to form a first printhead module with a first printhead of the three printheads being positioned between the other two printheads of the three printheads in a cross-process direction, the three printheads in the first printhead module being aligned in the cross-process direction so the three printheads can form a continuous line of pixels in the cross-process direction and the first printhead is offset from the other two printheads of the first printhead module in the process direction, each printhead having an ink inlet configured to supply ink to a manifold in the printhead, the manifold being configured to supply ink to at least one array of nozzles in the printhead, the ink flows through the manifold in each printhead in a flow direction, and the first printhead is oriented so ink flows in the manifold of the first printhead in a first flow direction that is opposite to a second flow direction in the manifolds of the other two printheads; and a second printhead module having at least three printheads mounted relative to the media transport, the at least three printheads in the second printhead module are aligned in the cross-process direction so the at least three printheads can form a continuous line of pixels in the cross-process direction, each printhead in the at least three printheads of the second printhead module having an ink inlet and a manifold through which ink flows to inkjets fluidly connected to the manifold and the second printhead module is positioned to follow the first printhead module in the process direction, every other printhead in the at least three printheads of the second printhead module are oriented so ink flows in a flow direction through a manifold of the every other printhead in the second printhead module in a direction that is opposite a direction that ink flows in the manifold of each printhead adjacent to the every other printhead, and the at least three printheads of the second printhead module are offset in the cross-process direction from the printheads in the first printhead module by one-half of a distance between adjacent inkjets in the cross-process direction.

* * * * *